United States Patent
He et al.

(10) Patent No.: US 12,039,775 B1
(45) Date of Patent: Jul. 16, 2024

(54) ADAPTIVE ATMOSPHERIC CORRECTION METHOD OF HYPERSPECTRAL SATELLITE BASED ON PRIOR GROUND OBJECT SPECTRAL MATCHING

(71) Applicant: WUHAN UNIVERSITY, Hubei (CN)

(72) Inventors: Tao He, Hubei (CN); Qianqian Jiang, Hubei (CN); Jun Lu, Hubei (CN); Siqi Feng, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/488,063

(22) Filed: Oct. 17, 2023

(30) Foreign Application Priority Data

Mar. 22, 2023 (CN) .......................... 202310281466.2

(51) Int. Cl.
 *G06V 20/10* (2022.01)
 *G06V 20/13* (2022.01)

(52) U.S. Cl.
 CPC ............ G06V 20/194 (2022.01); G06V 20/13 (2022.01); G06V 20/188 (2022.01)

(58) Field of Classification Search
 CPC ..... G06V 20/194; G06V 20/188; G06V 20/13
 See application file for complete search history.

(56) References Cited

U.S. PATENT DOCUMENTS

| 2015/0161768 A1 | 6/2015 | Ardouin et al. |
| 2023/0078777 A1 | 3/2023 | Raj et al. |

FOREIGN PATENT DOCUMENTS

| CN | 103267533 | 8/2013 |
| CN | 103712955 | 4/2014 |
| CN | 103760112 | 4/2014 |
| CN | 106407656 | 2/2017 |

(Continued)

OTHER PUBLICATIONS

Thompson, David R., et al. "Retrieval of atmospheric parameters and surface reflectance from visible and shortwave infrared imaging spectroscopy data." Surveys in Geophysics 40 (2019): 333-360. (Year: 2019).*

(Continued)

*Primary Examiner* — Vu Le
*Assistant Examiner* — Tracy Mangialaschi
(74) *Attorney, Agent, or Firm* — JCIP GLOBAL INC.

(57) ABSTRACT

The present disclosure provides an adaptive atmospheric correction method of hyperspectral satellite based on prior ground object spectral matching. The method includes: establishing an adaptive atmospheric parameter retrieval algorithm of hyperspectral satellite data; based on the estimation algorithm of the integrated atmospheric column water vapor content, using a function between a linear regression band ratio and a water vapor content for estimation; in the aerosol optical depth estimation method of the hyperspectral data, using the rich spectral information of the hyperspectral data to perform AOD iterative estimation with the ground object spectral library as prior knowledge in combination with spectral matching, and establishing an atmospheric correction algorithm combining with an MODTRAN radiative transfer model. The method is applicable to hyperspectral data characteristics and has high accuracy; and without depending on external auxiliary data, atmospheric correction can be completed automatically.

10 Claims, 3 Drawing Sheets

(56) References Cited

FOREIGN PATENT DOCUMENTS

| CN | 110009584 | 7/2019 |
| CN | 113610729 | 11/2021 |
| CN | 114581793 | 6/2022 |

OTHER PUBLICATIONS

Lee, K. H., and Y. J. Kim. "Satellite remote sensing of Asian aerosols: a case study of clean, polluted, and Asian dust storm days." Atmospheric Measurement Techniques 3.6 (2010): 1771-1784. (Year: 2010).*

Guanter, Luis, Rudolf Richter, and José Moreno. "Spectral calibration of hyperspectral imagery using atmospheric absorption features." Applied optics 45.10 (2006): 2360-2370. (Year: 2006).*

Mao, Yunxin et al., "Research on hyperspectral remote sensing open-pit minerals identification method based on spectral matching", Natural Resources Information, No. 4, Aug. 31, 2022, with English translation thereof, pp. 1-12.

Pan, Cencen et al., "Atmospheric Correction of Airborne Hyperspectral Image Based on Fruit Fly-Powell Optimization Algorithm", Spectroscopy and Spectral Analysis,01, vol. 38, No. 1, Jan. 5, 2018, with English translation thereof, pp. 1-22.

Wang, Yu et al., "Retrieval of Aerosol Optical Depth via DT Algorithm from Landsat-8 OLI Image", Spacecraft Recovery & Remote Sensing, 02, vol. 39, Issue. 2, Apr. 15, 2018, with English translation thereof, pp. 1-27.

Li, Qiangqiang et al., "Automation and Fast Processing of Atmospheric Correction for Hyperspectral Data", Remote Sensing Information, vol. 38, Issue. 1, Jan. 31, 2023, with English translation thereof, pp. 1-18.

Manoj K. Mishra et al., "Atmospheric parameter retrieval and correction using hyperspectral data", Hyperspectral Remote Sensing Theory and Applications Earth Observation 2020, Dec. 31, 2020, pp. 67-80.

* cited by examiner

ADAPTIVE ATMOSPHERIC CORRECTION METHOD OF HYPERSPECTRAL SATELLITE BASED ON PRIOR GROUND OBJECT SPECTRAL MATCHING

CROSS-REFERENCE TO RELATED APPLICATION

This application claims the priority benefit of China application serial no. 202310281466.2, filed on Mar. 22, 2023. The entirety of the above-mentioned patent application is hereby incorporated by reference herein and made a part of this specification.

TECHNICAL FIELD

The present disclosure relates to the satellite remote-sensing field, and in particular to an adaptive atmospheric correction method and system of hyperspectral satellite based on prior ground object spectral matching, which are applicable to the atmospheric correction of different hyperspectral satellite sensors.

BACKGROUND

Hyperspectral remote-sensing technology has always been regarded as a frontier field in the passive optical remote-sensing technologies. Benefiting from obtaining relatively "continuous" spectral curves of ground objects, the hyperspectral technology has been proved to have irreplaceable advantages and huge application prospect in many fields such as land surface fine classification, biochemical property detection of land surface and water bodies, and atmospheric environment monitoring and the like.

In recent years, along with continuous progress of the manufacturing technologies of hyperspectral earth observation instruments and the manufacturing technologies of satellites, various countries have launched or are planning to launch several visible short-wave infrared band hyperspectral sensors capable of providing rich data sources for hyperspectral remote-sensing applications. However, in contrast with prosperous platform construction, quantitative applications of the hyperspectral remote-sensing technology make slow progress. It is possibly because most of the hyperspectral sensors fail to construct an advanced product system for applications. Further, at present, the hyperspectral remote-sensing data pre-processing technology has low degree of automation, leading to high costs in hyperspectral data applications. In various hyperspectral data pre-processing algorithms, the atmospheric correction algorithm as a key step in the quantitative application of the remote-sensing data, becomes one of bottleneck technologies restricting the quantitative development of the hyperspectral data. For the key atmospheric parameter estimation method in the atmospheric correction algorithm, an estimation algorithm designed for multispectral data is still used in most of the current data preprocessing softwares, which brings an error to the atmospheric parameters and thus affects the accuracy of the atmospheric correction algorithm. The atmospheric correction method unsuitable for hyperspectral data characteristics and having low degree of automation hinders the progress of the quantitative application of the hyperspectral data.

In the present disclosure, after the data radiometric accuracy is verified, an atmospheric parameter estimation algorithm suitable for hyperspectral data characteristics and different visible short-wave infrared hyperspectral sensors is developed as input data to form an adaptive atmospheric correction algorithm of hyperspectral satellite data.

SUMMARY

In order to address the technical problem that the existing atmospheric correction method is not suitable for hyperspectral data characteristics and has low degree of automation, the present disclosure proposes an adaptive atmospheric correction method and system of hyperspectral satellite based on prior ground object spectral matching.

According to a first aspect of embodiments of the present disclosure, there is provided an adaptive atmospheric correction method of hyperspectral satellite based on prior ground object spectral matching, including:
  performing radiometric calibration on hyperspectral L1-level data to obtain an apparent reflectance of hyperspectral satellite images;
  retrieving an aerosol optical depth, comprising: estimating an initial value of the aerosol optical depth by using blue-green band; based on the initial value of the aerosol optical depth, obtaining an atmospheric parameter by lookup table; by using the apparent reflectance and the atmospheric parameter, calculating an initial value of a land surface reflectance; extracting an image element for estimation of the aerosol optical depth from the hyperspectral satellite images; from the selected image elements, searching, by using spectral angle matching, for a spectrum most similar in spectral morphology to the initial value of the land surface reflectance of the image elements in a ground object spectral library and calculating a scaling factor between the most similar spectrum and the initial value of the land surface reflectance of the image elements, and then based on the scaling factor, determining an initial value of a second land surface reflectance, and based on the initial value of the second land surface reflectance, recalculating the aerosol optical depth based on a minimum apparent reflectance estimation error to obtain the aerosol optical depth for iterative optimization to prevent the influence of a morphological difference between the initial value of the second land surface reflectance and the actual land surface reflectance on the estimation result and seek an optimal solution for the aerosol optical depth;
  based on linear regression band ratio, retrieving a water vapor content;
  inputting two geometric parameters, i.e. a view zenith angle and a solar zenith angle of the hyperspectral satellite images, an atmospheric model, and two atmospheric composition contents, i.e. an aerosol optical depth and a water vapor content obtained by retrieval into an MODTRAN radiative transfer model to obtain the atmospheric parameter in the lookup table and complete the atmospheric correction of the hyperspectral satellite images, wherein the MODTRAN radiative transfer model comprises an atmospheric correction lookup table with five dimensions which are the view zenith angle, the solar zenith angle, the aerosol optical depth, the water vapor content, and the atmospheric model.

According to a second aspect of embodiments of the present disclosure, there is provided an adaptive atmospheric correction system of hyperspectral satellite based on prior ground object spectral matching, including:
  an apparent reflectance calculating module, configured to perform radiometric calibration on hyperspectral L1-level data to obtain an apparent reflectance of hyperspectral satellite images;

an aerosol optical depth retrieving module, configured to: estimate an initial value of the aerosol optical depth by using blue-green band; based on the initial value of the aerosol optical depth, obtain an atmospheric parameter by lookup table; by using the apparent reflectance and the atmospheric parameter, calculate an initial value of a land surface reflectance; extract an image element for estimation of the aerosol optical depth from the hyperspectral satellite images; from the selected image elements, search, by using spectral angle matching, for a spectrum most similar in spectral morphology to the initial value of the land surface reflectance of the image elements in a ground object spectral library and calculate a scaling factor between the most similar spectrum and the initial value of the land surface reflectance of the image elements, and then based on the scaling factor, determine an initial value of a second land surface reflectance, and based on the initial value of the second land surface reflectance, recalculate the aerosol optical depth based on a minimum apparent reflectance estimation error to obtain the aerosol optical depth for iterative optimization to prevent the influence of a morphological difference between the initial value of the second land surface reflectance and the actual land surface reflectance on the estimation result and seek an optimal solution for the aerosol optical depth;

a water vapor content retrieving module, configured to, based on linear regression band ratio, retrieve a water vapor content;

an MODTRAN radiative transfer model, comprising an atmospheric correction lookup table with five dimensions which are a view zenith angle, a solar zenith angle, the aerosol optical depth, a water vapor content, and an atmospheric model, and configured to input two geometric parameters, i.e. the view zenith angle and the solar zenith angle of the hyperspectral satellite images, the atmospheric model, and two atmospheric composition contents, i.e. the aerosol optical depth and the water vapor content obtained by retrieval into an MODTRAN radiative transfer model to obtain the atmospheric parameter in the lookup table and complete the atmospheric correction of the hyperspectral satellite images.

According to a fourth aspect of embodiments of the present disclosure, there is provided a computer, including a processor; a memory, including one or more computer program modules, where the one or more computer program modules are stored in the memory and configured to be executed by the processor, and the one or more computer program modules include instructions for performing the above adaptive atmospheric correction method of hyperspectral satellite based on prior ground object spectral matching.

According to a fifth aspect of embodiments of the present disclosure, there is provided a computer readable storage medium, storing non-transitory computer readable instructions, where the non-transitory computer readable instructions are executed by a computer to perform the above adaptive atmospheric correction method of hyperspectral satellite based on prior ground object spectral matching.

The present disclosure has the following beneficial effects:

1. suitable for hyperspectral data characteristics and high in accuracy;
2. without depending on external auxiliary data, automatically perform atmospheric correction;
3. The present disclosure is not limited to a particular sensor nor to a particular land surface type, and can be applied to multiple types of earth observation hyperspectral satellite data at home and abroad.

BRIEF DESCRIPTIONS OF THE DRAWINGS

In order to more clearly describe the technical solutions of embodiments of the present disclosure, the accompanying drawings of the embodiments of the present disclosure will be briefly introduced below.

DETAILED DESCRIPTIONS OF EMBODIMENTS

Figure 1:
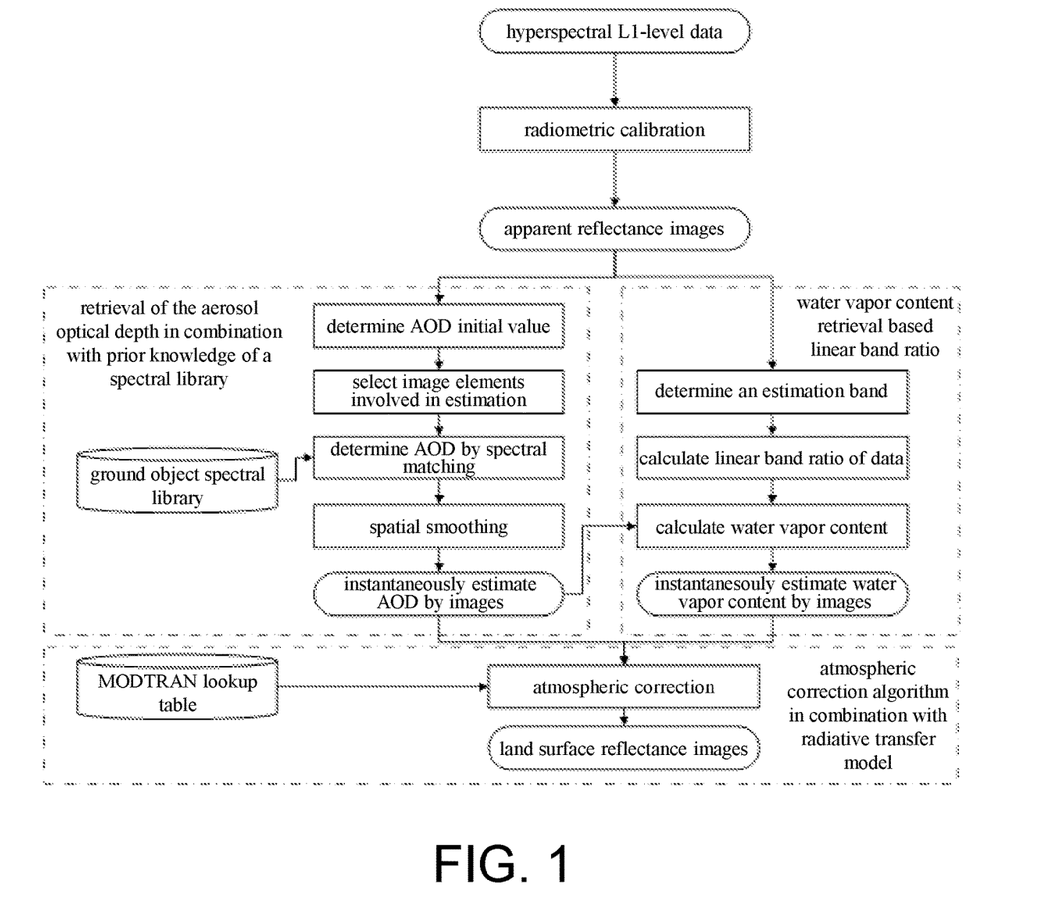
FIG. 1 is a flowchart illustrating an adaptive atmospheric correction method of hyperspectral satellite based on prior ground object spectral matching according to the present disclosure.

FIG. 1 is an adaptive atmospheric correction method of hyperspectral satellite based on prior ground object spectral matching. The method shown in FIG. 1 will be described in details below. In the embodiments, the hyperspectral images of GF5B AHSI sensor are taken as hyperspectral satellite images subjected to atmospheric correction.

At step 1, radiometric calibration is performed on raw hyperspectral L1-level data to obtain an apparent reflectance of hyperspectral satellite images;

At step 1.1, a radiometric calibration coefficient is obtained from a hyperspectral image folder, and based on the following formula, an DN value of the hyperspectral L1-level data is converted into an apparent radiance L.

$$L = DN * gains + offset$$

where gains refers to a gain of the radiometric calibration coefficient of the hyperspectral images, and offset refers to an offset value of the radiometric calibration coefficient of the hyperspectral images.

At step 1.2, a spectral response function is read and subjected to integration together with a solar spectrum. Based on the following formula, a solar irradiance $\overline{E_0}$ at a mean sun-earth distance is obtained:

$$\overline{E_0} = \frac{\int_{\lambda_1}^{\lambda_2} E(\lambda) S(\lambda) d\lambda}{\int_{\lambda_1}^{\lambda_2} S(\lambda) d\lambda}$$

where $S(\lambda)$ refers to a spectral response function of the sensor, $\lambda_1$ and $\lambda_2$ are start and end wavelengths of the spectral response function, $E(\lambda)$ refers to a solar spectrum. For a hyperspectral sensor, the spectral response function of the wave band is usually simulated by using Gaussian function:

$$f(\lambda_i, \sigma) = \exp\left(\frac{-(\lambda_i - \lambda_c)^2}{2\sigma^2}\right)$$

where $\sigma$ $$\sigma = \frac{FWHM}{2\sqrt{2\ln 2}},$$

$\lambda_i$ is a calculated wavelength, $\lambda_c$ is a central wavelength of the wave band, and FWHM is a half-wave width.

Based on an imaging time of the images, a solar incident irradiance $E_0$ at the imaging time is obtained:

$$E_0 = \overline{E_0} * \left[1 + 0.033 * \cos\left(\frac{2\pi d_n}{365}\right)\right]$$

where $d_n$ refers to a day of year starting from January 1 of the current year (28 days are calculated in February).

At step 1.3, based on the following formula, the apparent reflectance $\rho^*$ is obtained.

$$\rho^* = \frac{\pi * L}{E_0 * \cos(\theta_S)}$$

where $\theta_s$ is a solar zenith angle.

Cloud mask information is read to mask off a region covered by cloud on the images.

An image aerosol type is determined. When a latitude on which the images are located is lower than 20°, the aerosol type is type 1; when the latitude on which the images are located is higher than 20° and lower than 35°, if the images are obtained between July and September and at the altitude of lower than 30°, the aerosol type is type 1 and otherwise is type 2; when the latitude on which the images are located is higher than 35° and lower than 45°, if the images are obtained between July and September and at the altitude of lower than 40°, the aerosol type is type 2 and otherwise is type 4; when the latitude on which the images are located is higher than 450 and lower than 55°, if the images are obtained between April and November, the aerosol type is type 4 and otherwise is type 3; when the latitude on which the images are located is higher than 550 and lower than 65°, if the images are obtained between July and September, the aerosol type is type 3 and otherwise is type 4.

At step 2, an adaptive atmospheric parameter retrieval algorithm of hyperspectral satellite data based on prior ground object spectral matching is established. For two atmospheric compositions, an integrated atmospheric column water vapor content and an aerosol optical depth, a retrieval algorithm adapted to hyperspectral data characteristics is established to retrieve the aerosol optical depth and the integrated atmospheric column water vapor content.

At step 2.1, retrieval is performed in combination with the aerosol optical depth of the prior knowledge of the spectral library. The USGS Version 7 spectral library may be used as a source of prior information of the ground object spectral library. Suppose the reflection spectra of the ground objects of same type are similar, the land surface reflectance may be predicted using the ground object spectral library to reduce those unknown variables in the remote-sensing retrieval. In combination with spectral matching method, iterative estimation is performed on the aerosol optical depth.

At step 2.1.1, an initial value of the aerosol optical depth is estimated. The apparent reflectance of the ground object in the blue-green band mainly expresses a scatter effect of the aerosol and is influenced little by other trace gas contents. In this embodiment, it is supposed that the image elements with the minimum apparent reflectance in the blue-green band (a band within the wavelength of 300 to 550 nm) in the images have a land surface reflectance of 0, and thus, it is thought that the apparent reflectances of these image elements are only affected by the atmospheric scatter effect, which is called atmospheric path radiation. In combination with a path radiation lookup table, a largest possible value $\tau_{max}$ of the aerosol optical depth of the images can be calculated based on minimum error.

At step 2.1.2, an initial value of the land surface reflectance is estimated. According to a possible maximum value $\tau_{max}$ of the aerosol optical depth, a lookup table is created by using an MODTRAN model to obtain an atmospheric parameter. The initial value of the land surface reflectance can be obtained based on the apparent reflectance in the following formula.

$$\rho^* = \frac{T * \rho_s}{1 - s * \rho_s} + \rho_{path}$$

where T is an atmospheric transmittance, s is a Bond albedo, $\rho_{path}$ is a atmospheric path radiation, which are all atmospheric parameters obtained from the lookup table; $\rho_s$ is a land surface reflectance, and $\rho^*$ is an apparent reflectance.

At step 2.1.3, image elements for estimation of the aerosol optical depth are extracted from the images. In order to save estimation time, it is thought in the present disclosure that the aerosol optical depth within a 30*30 image element (900 m*900 m) window is consistent and one image element is selected from the 30*30 window to participate in the estimation of the aerosol optical depth. Considering the error of estimating the aerosol optical depth on a bright land surface is large, in the present disclosure, image elements with large normalized difference vegetation index (NDVI) and high consistency with surrounding image elements or a small apparent reflectance are selected to form aerosol optical depth calculation images.

At step 2.1.4, in the selected image elements, with the ground object spectral library as prior knowledge, the aerosol optical depth is retrieved by performing spectral matching and iterative optimization on each image element. The ground object spectral library involved in the estimation of the aerosol optical depth is finally formed by spectra obtained by performing linear mixing on vegetation spectra $Spec_{veg}$ and soil spectra $Spec_{soil}$ in a reference spectral library.

$$Spec_{lib} = \{Spec_i; Spec_i = \alpha * Spec_{veg} + (1-\alpha) * Spec_{soil}\}$$

In the above formula, $Spec_{lib}$ refers to a constructed ground object spectral library, $Spec_i$ is one spectrum in the ground object spectral library, $\alpha$ is a mixing coefficient of the vegetation spectra and the soil spectra, where a is between 0 to 1 with an interval of 0.1.

After the ground object spectral library is determined, a spectrum most similar in spectral morphology to the initial value $\rho_0$ of the land surface reflectance of the estimation image elements in a ground object spectral library is searched for by using spectral angle matching, that is, a spectrum with a shortest cosine distance from $\rho_0$ is searched for in the ground object spectral library. A cosine distance of an i-th spectrum in the spectral library from the estimation image elements can be expressed as follows:

$$SA_i = \cos^{-1} \frac{\rho_0^T * Spec_i}{\sqrt{(Spec_i)^T Spec_i} \sqrt{\rho_0^T \rho_0}}$$

A scaling factor k between the spectrum with the smallest cosine distance and the initial value of the land surface reflectance of the estimation image elements is calculated to obtain an initial value $\rho_{sec}$ of a second land surface reflectance:

$$\rho_{sec} = k * Spec_i$$

Based on $\rho_{sec}$, the aerosol optical depth is recalculated based on a minimum apparent reflectance estimation error $\varepsilon_{TOA}$ to obtain the aerosol optical depth (AOD) for iterative optimization to prevent the influence of a morphological difference between $\rho_{sec}$ and the actual land surface reflectance on the estimation result and seek an optimal solution for the AOD.

Considering different contributions of different bands of different wavelengths for the AOD estimation, the aerosol has more obvious impact on the short-wave band. In this embodiment, the error $\varepsilon_{TOA}$ of the apparent reflectance is obtained by performing weighted calculation on the reciprocal of the wavelength:

$$\varepsilon_{TOA} = \sum_{i=1}^{n} \frac{(|\rho_{Simu,i} - \rho_{img,i}|)}{\lambda_i}$$

where $\rho_{Simu,i}$ refers to an i-band apparent reflectance simulated under the current aerosol optical depth, $\rho_{img,i}$ is an i-band apparent reflectance obtained from the hyperspectral images, and $\lambda_i$ refers to a central wavelength of an i-band.

At step 2.1.5, error culling and spatial filtering are performed on the estimation result of the aerosol optical depth. If the apparent reflectance estimation error of all image elements satisfies truncated normal distribution greater than the minimum error value, the estimation value of the variance of the value greater than three times the difference of the error and the minimum value is culled. Since the aerosol optical depth changes relatively slowly in space, the spatial filtering method for the aerosol optical depth is selected as median filtering method of 3*3 window.

At step 2.2, water vapor content retrieval is performed based on linear regression band ratio of absorption belts. The water vapor content retrieval is usually performed using two absorption belts of 940 nm and 1140 nm. In the continuum interpolated band ratio (CIBR) method, modeling is performed using an apparent reflectance ratio between a non-absorption belt and an absorption belt at both ends of the water vapor absorption belts and the water vapor content:

$$\log(CIBR) = a * pwv^b$$

where CIBR refers to an apparent reflectance ratio between a non-absorption belt and an absorption belt at both ends of the water vapor absorption belts, and pwv is an integrated atmospheric column water vapor content, and a and b are regression coefficients.

In practical application processes, considering the hyperspectral data has multiple bands and each band has unstable radiation performance, the multi-band linear regression method, i.e. the LInear Regression band Ratio (LIRR) is used to replace the single band ratio CIBR to improve the stability of water vapor content retrieval and reduce the influence of sensor noise on algorithm retrieval accuracy. The LIRR is defined as follows:

$$LIRR = \frac{\text{mean}(\rho_m)}{\omega_{m_1} * \text{mean}(\rho_{m_1}) + \omega_{m_2} * \text{mean}(\rho_{m_2})}$$

where $\rho_m$ an average apparent reflectance of a central absorption band, $\rho_{m_1}$ is an average apparent reflectance of the left non-absorption band of the absorption bands, $\rho_{m_2}$ is a right average reflectance, $\omega_{m_1}$ and $\omega_{m_2}$ are coefficients of performing weighting on the two bands based on a distance from the wavelength of the absorption bands.

A power function relationship between the logarithm of the LIRR and the integrated atmospheric water vapor content is as follows:

$$\log(LIRR) = a * pwv^b$$

where pwv refers to an integrated atmospheric column water vapor content and a and b are regression coefficients.

By using the MODTRAN radiative transfer model, the apparent reflectances of different land surfaces under different water vapor contents, aerosol types and aerosol optical depths are simulated and regression is performed on the LIRR of each case and the simulated water vapor content to obtain a regression relational expression under different cases. Based on the apparent reflectance and the aerosol type of GF5B AHSI images, and the aerosol optical depth obtained in step 2.1, a regression relational expression suitable for the current water vapor retrieval of the hyperspectral images can be determined and the water vapor content can be obtained based on the apparent reflectance.

At step 3, an atmospheric correction algorithm combined with MODTRAN radiative transfer model is established. A lookup table is created using the MODTRAN radiative transfer model to finally obtain the hyperspectral land surface reflectance data.

At step 3.1, by using the MODTRAN radiative transfer model, an atmospheric correction lookup table with five dimensions which are a view zenith angle, a solar zenith angle, the AOD, the water vapor content and an atmospheric model is established.

At step 3.2, two atmospheric composition contents AOD and PWV obtained through estimation in step 2 and two geometric parameters the view zenith angle and the solar zenith angle of the hyperspectral satellite images and the atmospheric model are input, such that the atmospheric parameter is obtained from the lookup table, that is, the land surface reflectance is obtained based on the apparent reflectance, so as to complete the atmospheric correction of the hyperspectral images.

In one embodiment, there is further provided an adaptive atmospheric correction system of hyperspectral satellite based on prior ground object spectral matching, including: an apparent reflectance calculating module, an aerosol optical depth retrieving module, a water vapor content retrieving module, and an MODTRAN radiative transfer model.

The apparent reflectance calculating module is configured to perform radiometric calibration on hyperspectral L1-level data to obtain an apparent reflectance of hyperspectral satellite images;

the aerosol optical depth retrieving module is configured to: estimate an initial value of the aerosol optical depth by using blue-green band; based on the initial value of the aerosol optical depth, obtain an atmospheric parameter by lookup table; by using the apparent reflectance and the atmospheric parameter, calculate an initial value of a land surface reflectance; extract an image element for estimation of the aerosol optical depth from the hyperspectral satellite images; from the selected image elements, search, by using spectral angle matching, for a spectrum most similar in spectral morphology to the initial value of the land surface reflectance of the image elements in a ground object spectral library and calculate a scaling factor between the most similar spectrum and the initial value of the land surface reflectance of the image elements, and then based on the scaling factor, determine an initial value of a second land surface reflectance, and based on the initial value of the second land surface reflectance, recalculate the aerosol optical depth based on a minimum apparent reflectance estimation error to obtain the aerosol optical depth for iterative optimization to prevent the influence of a morphological difference between the initial value of the second land surface reflectance and the actual land surface reflectance on the estimation result and seek an optimal solution for the aerosol optical depth;

the water vapor content retrieving module is configured to, based on a linear regression band ratio, retrieve a water vapor content;

the MODTRAN radiative transfer model includes an atmospheric correction lookup table with five dimensions which are the view zenith angle, the solar zenith angle, the aerosol optical depth, the water vapor content, and the atmospheric model, and is configured to input two geometric parameters, i.e. the view zenith angle and the solar zenith angle of the hyperspectral satellite images, the atmospheric model, and two atmospheric composition contents, i.e. the aerosol optical depth and the water vapor content obtained by retrieval, into the MODTRAN radiative transfer model to obtain the atmospheric parameter in the lookup table and complete the atmospheric correction of the hyperspectral images.

The more detailed implementation methods of the apparent reflectance calculating module, the aerosol optical depth retrieving module, the water vapor content retrieving module and the MODTRAN radiative transfer model can be referred to the steps 1 to 3 in the above method embodiments.

In one embodiment, there is further provided a computer. The computer includes a processor and a memory. The memory is configured to store non-transitory computer readable instructions (e.g. one or more computer program modules). The processor is configured to run the non-transitory computer readable instructions to perform one or more steps in the above adaptive atmospheric correction method of hyperspectral satellite based on prior ground object spectral matching. The memory and the processor may be mutually connected via a bus system and/or another form of connection mechanism.

For example, the processor may be a central processing unit (CPU), a graphics processing unit (GPU), or another processing unit having data processing capability and/or program execution capability. For example, the central processing unit (CPU) may be of X86 or ARM architecture. The processor may be a general processor or a dedicated processor to control other components in a computer to execute desired functions.

For example, the memory may include any combination of one or more computer program products, and the computer program products may include various forms of computer readable storage mediums, for example, a volatile and/or non-volatile memory. The volatile memory may include, for example, a Random Access Memory (RAM) and/or high speed buffer memory (Cache) and the like. The non-volatile memory may include, for example, a Read Only Memory (ROM), a harddisk drive, an erasable programmable read-only memory (EPROM), a compact disk read only memory (CD-ROM), a USB memory, a flash memory and the like. The computer readable storage medium may store one or more computer program modules, and the processor may run one or more computer program modules to achieve various computer functions.

In one embodiment, there is further provided a computer readable storage medium configured to store non-transitory computer readable instructions. The non-transitory computer readable instructions are executed by a computer to perform one or more steps in the above adaptive atmospheric correction method of hyperspectral satellite based on prior ground object spectral matching. The adaptive atmospheric correction method and system of hyperspectral satellite based on prior ground object spectral matching according to the embodiments of the present disclosure, when implemented in the form of software and sold or used as an independent product, can be stored in one computer readable storage medium. The descriptions of the storage medium can be referred to the corresponding descriptions of the memory in the computer as mentioned above and will not be repeated herein.

In the present disclosure, programs can be written using Python language based on Windows 10 operating system. The developed hardware environment may be (1) CPU: Intel® Core™ i7-7700 CPU @ 3.60 GHz; (2) memory: 48G; (3): harddisk drive: 930G. The hardware environment in which the programs run requires the computer memory to be greater than or equal to 16G.

Figure 2:
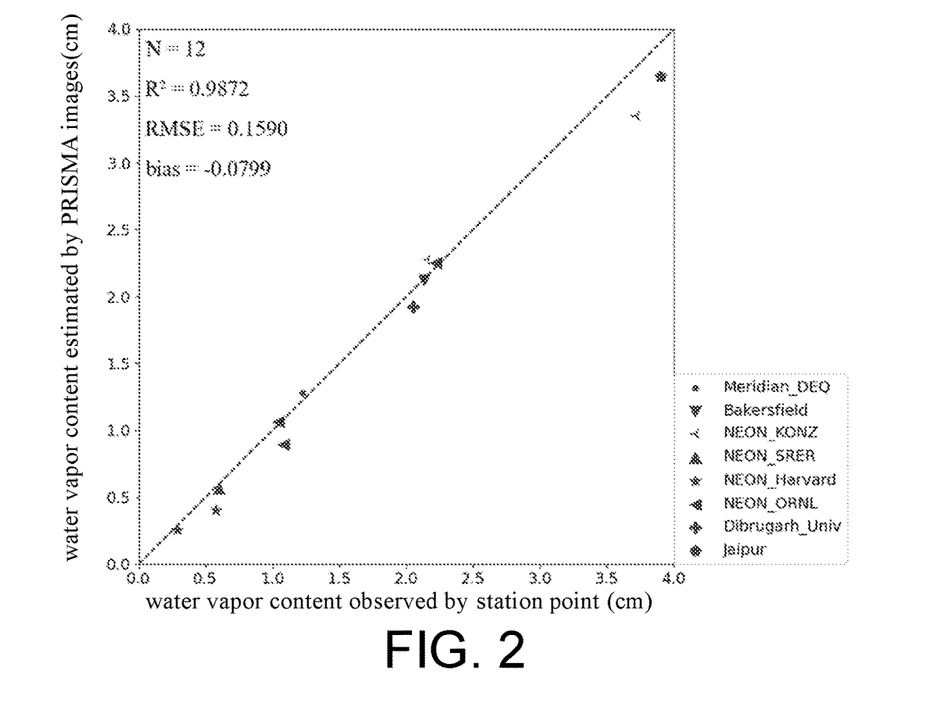
FIG. 2 is a validation scatter diagram of a water vapor content measured in AERONET station point and PRISMA image retrieval result.

FIG. 2 is a validation scatter diagram of a water vapor content measured in AERONET station point and PRISMA image retrieval result. A water vapor content estimation result at the corresponding position of the AERONET station point is extracted from the estimated water vapor content images and compared with a water vapor content result observed in the AERONET station point at the latest imaging time. The abscissa is the water vapor content observed by station point and the ordinate is the water vapor content estimated by PRISMA images. Different symbols represent 18 AERONET station points. In the drawing, N represents a number of samples, bias represents an average error, $R^2$ represents a determination coefficient, and RMSE represents a root mean square error.

Figure 3:
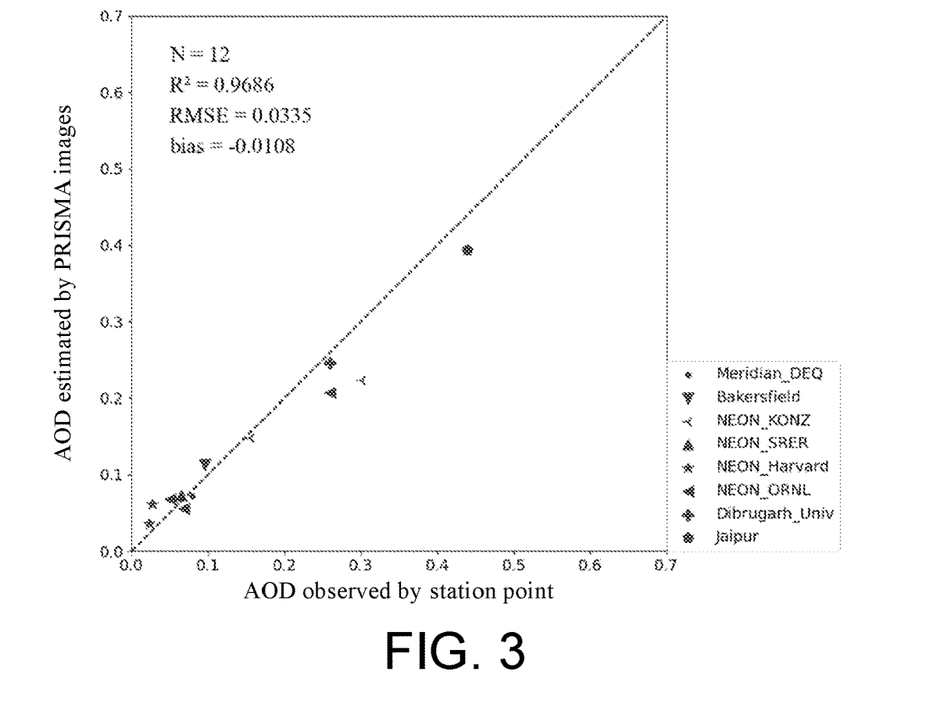
FIG. 3 is a validation scatter diagram of an aerosol optical depth (AOD) measured in AERONET station point and PRISMA image retrieval result.

FIG. 3 is a validation scatter diagram of an aerosol optical depth (AOD) measured in AERONET station point and PRISMA image retrieval result. An estimation result at the corresponding position of the AERONET station point is extracted from the estimated AOD images and compared with a result observed by the AERONET station point at the latest imaging time. The abscissa is the AOD observed by the station point and the ordinate is the AOD estimated by PRISMA images. Different symbols represent 18 AERONET station points. In the drawing, N represents a number of samples, $R^2$ represents a determination coefficient, RMSE represents a root mean square error, and bias represents an average error.

Figure 4A:
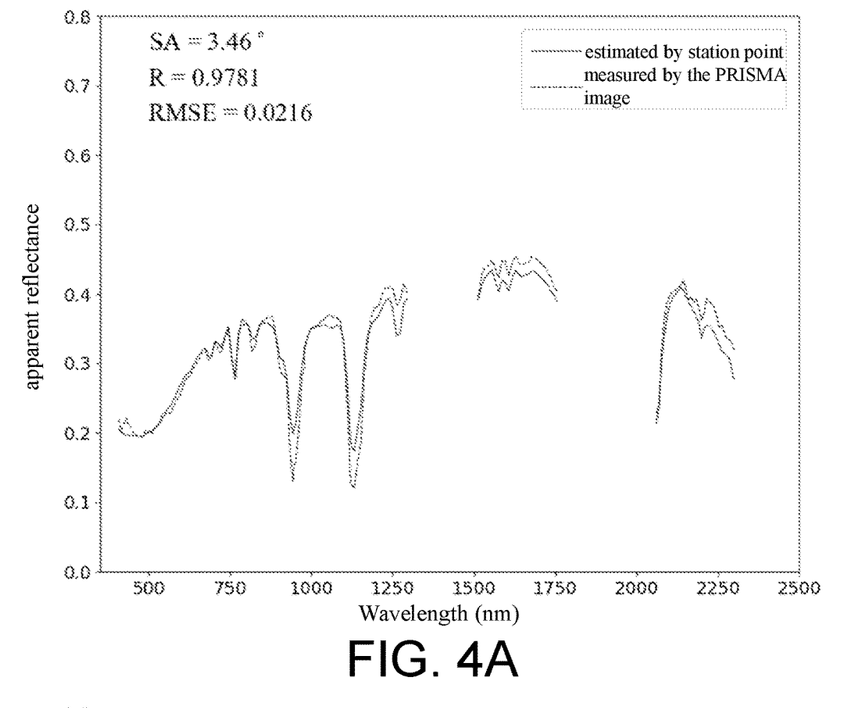
FIGS. 4A to 4B are comparison diagrams of a spectral curve of a station point reflectance and a spectral curve of an image reflectance.
Figure 4B:
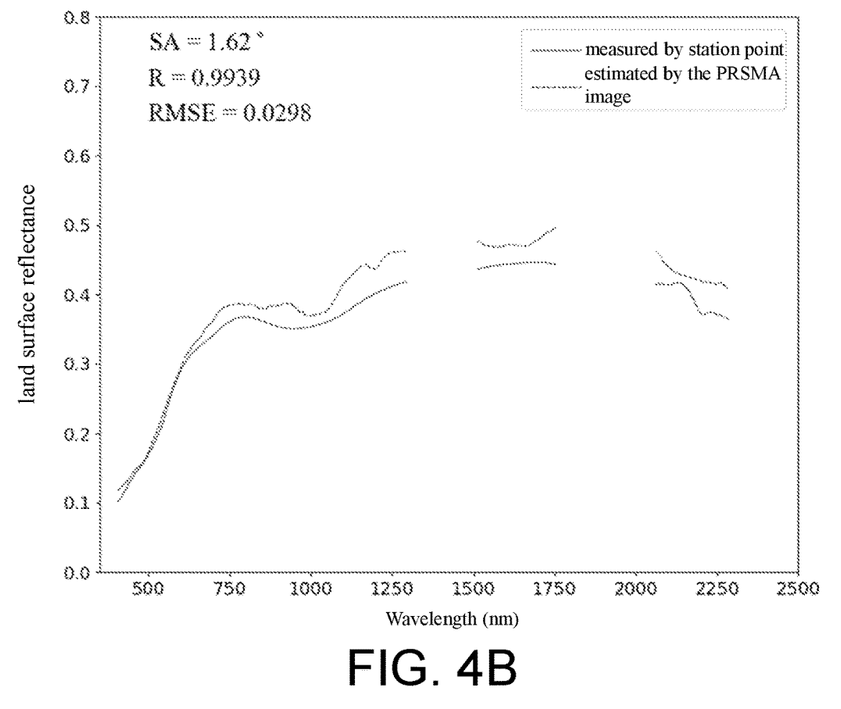

FIGS. 4A to 4B are comparison diagrams of a spectral curve of a station point reflectance and a spectral curve of an image reflectance. In FIG. 4A, the abscissa is a wavelength and the ordinate is an apparent reflectance, the solid line is an apparent reflectance estimated by the RadCalNet station point, and the dotted line is an apparent reflectance actually measured by the PRISMA image; in the drawing, SA refers to a spectral angle of two spectral curves, R refers to a relevance coefficient of two spectral curves, and RMSE refers to a room mean square error. In the FIG. 4B, the abscissa is a wavelength and the ordinate is a land surface reflectance, the solid line is a land surface reflectance measured by the RadCalNet station point, and the dotted line is a land surface reflectance estimated by performing atmospheric correction on the PRSMA image; in the drawing, SA refers to a spectral angle of two spectral curves, R refers to a relevance coefficient of two spectral curves, and RMSE refers to a room mean square error.

The validation result for the specific embodiments shows that the atmospheric parameter estimation method in the present disclosure has good estimation accuracy for two major atmospheric parameters; after atmospheric correction, the land surface reflectance of the hyperspetral images also has a high accuracy and is consistent with the data of the Landsat 8 land surface reflectance.

What is claimed is:

1. An adaptive atmospheric correction method of hyperspectral satellite based on prior ground object spectral matching, comprising:
    performing radiometric calibration on hyperspectral L1-level data to obtain an apparent reflectance of hyperspectral satellite images;
    retrieving an aerosol optical depth, comprising: estimating an initial value of the aerosol optical depth by using blue-green band, combine with a path radiation lookup table to calculate a largest possible value of the aerosol optical depth based on a minimum error; based on the initial value of the aerosol optical depth and the largest possible value of the aerosol optical depth, obtaining an atmospheric parameter by lookup table; by using the apparent reflectance and the atmospheric parameter, calculating an initial value of a first land surface reflectance; extracting an image element for estimation of the aerosol optical depth from the hyperspectral satellite images; from the selected image elements, searching, by using spectral angle matching, fora spectrum with a shortest cosine distance from the initial value of the first land surface reflectance of the image elements in a ground object spectral library and calculating a scaling factor between the spectrum with the shortest cosine distance and the initial value of the first land surface reflectance of the image elements, wherein a mixed-pixel spectral library, constructed by linearly mixing spectra of pure ground objects, is introduced for the spectral angle matching, and then based on the scaling factor, determining an initial value of a second land surface reflectance, and based on the initial value of the second land surface reflectance, recalculating the aerosol optical depth based on a minimum apparent reflectance estimation error to obtain the aerosol optical depth for iterative optimization to prevent an influence of a morphological difference between the initial value of the second land surface reflectance and an actual land surface reflectance on an estimation result and seek an optimal solution for the aerosol optical depth;
    performing an error culling and a spatial filtering on the estimation result of the aerosol optical depth;
    based on linear regression band ratio, retrieving a water vapor content;
    inputting two geometric parameters, i.e. a view zenith angle and a solar zenith angle of the hyperspectral satellite images, an atmospheric model, and two atmospheric composition contents, i.e. an aerosol optical depth and a water vapor content obtained by retrieval into an MODTRAN radiative transfer model to obtain the atmospheric parameter in the lookup table according to the apparent reflectance and the first land surface reflectance and complete the atmospheric correction of the hyperspectral satellite images, wherein the MODTRAN radiative transfer model comprises an atmospheric correction lookup table with five dimensions which are the view zenith angle, the solar zenith angle, the aerosol optical depth, the water vapor content, and the atmospheric model,
    wherein the ground object spectral library is represented by the following:

$$Spec_{lib} = \{Spec_i : Spec_i = \alpha * Spec_{veg} + (1-\alpha) * Spec_{soil}\}$$

wherein $Spec_{lib}$ refers to a constructed ground object spectral library, $Spec_i$ is one spectrum in the ground object spectral library, a is a mixing coefficient of vegetation spectra and soil spectra, where a is between 0 to 1 with an interval of 0.1.

2. The adaptive atmospheric correction method of claim 1, wherein an error of the apparent reflectance is obtained by performing weighted calculation on a reciprocal of a wavelength.

3. The adaptive atmospheric correction method of claim 1, wherein image elements with large normalized difference vegetation index and high consistency with surrounding image elements or a small apparent reflectance are selected to form aerosol optical depth calculation images.

4. The adaptive atmospheric correction method of claim 1, wherein the ground object spectral library is formed by spectra obtained by performing linear mixing on the vegetation spectra and the soil spectra.

5. An adaptive atmospheric correction system of hyperspectral satellite based on prior ground object spectral matching, comprising:
    an apparent reflectance calculator, configured to perform radiometric calibration on hyperspectral L1-level data to obtain an apparent reflectance of hyperspectral satellite images;
    an aerosol optical depth retriever, configured to: estimate an initial value of the aerosol optical depth by using blue-green band, and combine with a path radiation lookup table to calculate a largest possible value of the aerosol optical depth based on a minimum error; based on the initial value of the aerosol optical depth and the largest possible value of the aerosol optical depth, obtain an atmospheric parameter by lookup table; by using the apparent reflectance and the atmospheric parameter, calculate an initial value of a first land surface reflectance; extract an image element for estimation of the aerosol optical depth from the hyperspectral satellite images; from the selected image elements, search, by using spectral angle matching, for a spectrum with a shortest cosine distance from the initial value of the first land surface reflectance of the image elements in a ground object spectral library and calculate a scaling factor between the spectrum with the shortest cosine distance and the initial value of the first land surface reflectance of the image elements, wherein a mixed-pixel spectral library, constructed by linearly mixing spectra of pure ground objects, is introduced for the spectral angle matching, and then based on the scaling factor, determine an initial value of a second land surface reflectance, and based on the initial value of the second land surface reflectance, recalculate the aerosol optical depth based on a minimum apparent reflectance estimation error to obtain the aerosol optical depth for iterative optimization to prevent an influence of a morphological difference between the initial value of the second land surface reflectance and an actual land surface reflectance on an estimation result and seek an optimal solution for the aerosol optical depth; performing an error culling and a spatial filtering on the estimation result of the aerosol optical depth;

a water vapor content retriever, configured to, based on linear regression band ratio, retrieve a water vapor content;

an MODTRAN radiative transfer model, comprising an atmospheric correction lookup table with five dimensions which are a view zenith angle, a solar zenith angle, the aerosol optical depth, a water vapor content, and an atmospheric model, and configured to input two geometric parameters, i.e. the view zenith angle and the solar zenith angle of the hyperspectral satellite images, the atmospheric model, and two atmospheric composition contents, i.e. the aerosol optical depth and the water vapor content obtained by retrieval into the MODTRAN radiative transfer model to obtain the atmospheric parameter in the lookup table according to the apparent reflectance and the first land surface reflectance and complete the atmospheric correction of the hyperspectral satellite images, wherein the ground object spectral library is represented by the following:

$$Spec_{lib} = \{Spec_i : Spec_i = \alpha * Spec_{veg} + (1-\alpha) * Spec_{soil}\}$$

wherein $Spec_{lib}$ refers to a constructed ground object spectral library, $Spec_i$ is one spectrum in the ground object spectral library, a is a mixing coefficient of vegetation spectra and soil spectra, where a is between 0 to 1 with an interval of 0.1.

6. The adaptive atmospheric correction system of claim 5, wherein an error of the apparent reflectance is obtained by performing weighted calculation on a reciprocal of a wavelength.

7. The adaptive atmospheric correction system of claim 5, wherein image elements with large normalized difference vegetation index and high consistency with surrounding image elements or a small apparent reflectance are selected to form aerosol optical depth calculation images.

8. The adaptive atmospheric correction system of claim 5, wherein the ground object spectral library is formed by spectra obtained by performing linear mixing on the vegetation spectra and the soil spectra.

9. A computer, comprising:
a processor;
a memory, comprising one or more computer program modules;
wherein the one or more computer program modules are stored in the memory and configured to be executed by the processor, and the one or more computer program modules comprise instructions for performing the adaptive atmospheric correction method of claim 1.

10. A computer readable storage medium, storing non-transitory computer readable instructions, wherein the non-transitory computer readable instructions are executed by a computer to perform the adaptive atmospheric correction method of claim 1.

* * * * *